Sept. 5, 1967  W. M. BURNSIDE  3,340,488
SEPARABLE GANG RELAY COIL AND STATOR ASSEMBLY
Filed Aug. 30, 1965  2 Sheets-Sheet 1
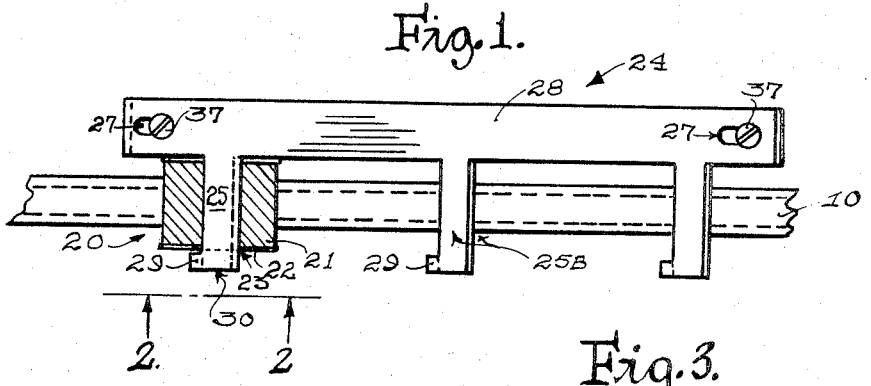
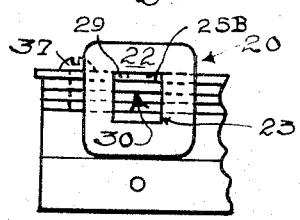
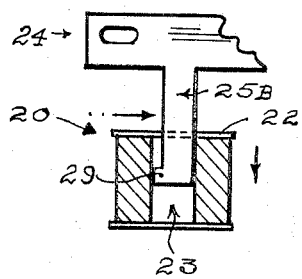
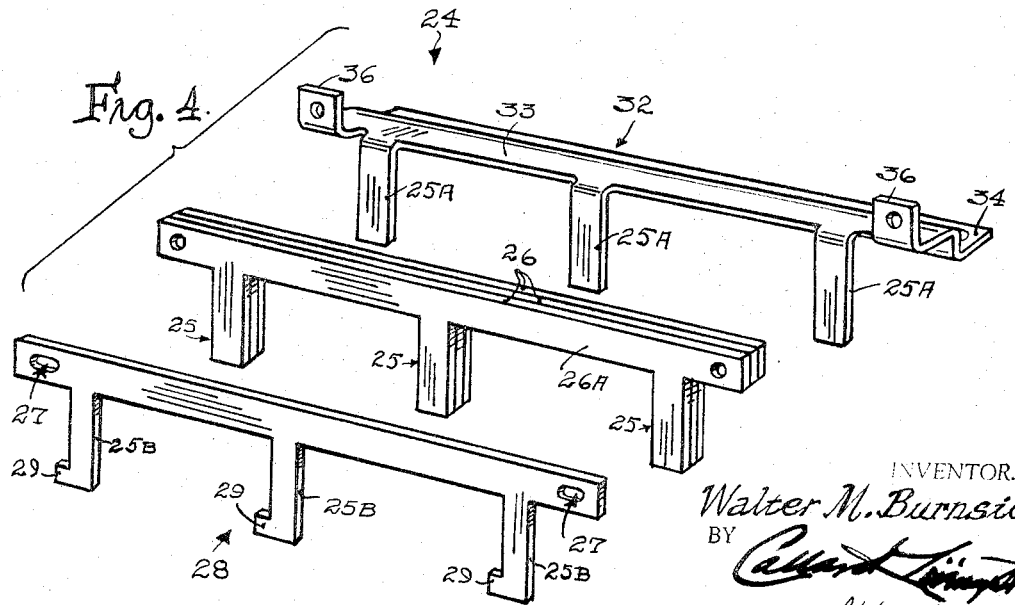
INVENTOR.
Walter M. Burnside
BY
Attorney.

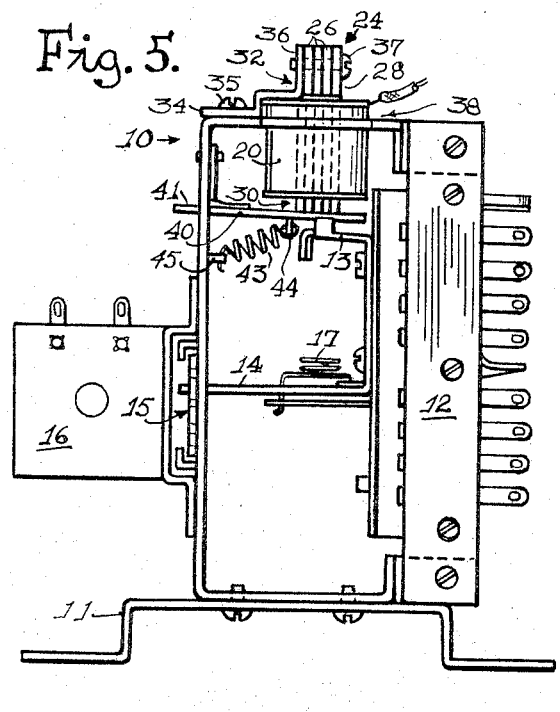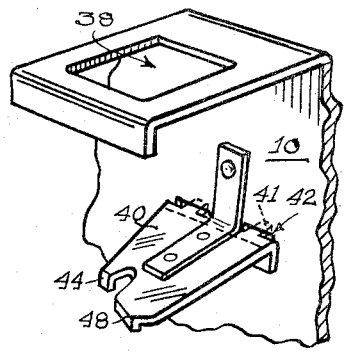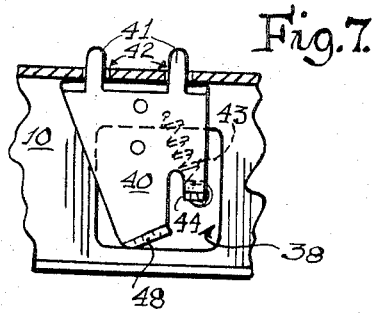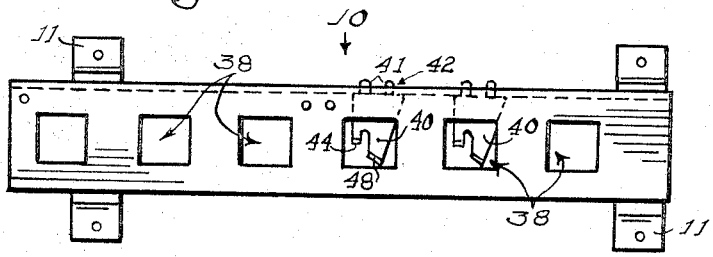

United States Patent Office 3,340,488
Patented Sept. 5, 1967

3,340,488
SEPARABLE GANG RELAY COIL AND
STATOR ASSEMBLY
Walter M. Burnside, Waukegan, Ill., assignor to Lion Manufacturing Corporation, Chicago, Ill., a corporation of Illinois
Filed Aug. 30, 1965, Ser. No. 483,582
12 Claims. (Cl. 335—281)

This invention has as its object the provision of a multiple or gang coil assembly for use in a gang relay of the trip-out and reset variety in which any of a plurality of contact sets may be tripped by its own electromagnet from a pre-set or nonoperative condition to a released or operative condition. An example of this type of gang relay is disclsed in my copending application, Ser. No. 503,505.

The gang coil assembly is characterized by such features as the provision of a common stator or field assembly having a desired number of salient poles each provided with its own release or trip coil disposed in alignment with a corresponding trip-out armature for the appertaining contact set.

Another feature relates to the provision in the gang stator assembly of a shiftable coil-locking lamination or bar having coil-locking formations at each of the several salient pole faces for locking the corresponding coil in position, in order that individual coils may be installed and removed as desired.

A further feature is the provision of a gang relay coil assembly comprising a stator assembly having a desired number of salient poles each receiving a corresponding relay coil thereon and each having coil-retaining means for capturing the coils included in the assembly so that the stator and coils comprise a unit which may be installed on a relay chassis having a number of individual armatures each actuated by one of the coils on the gang stator asesmbly.

Still further features and aspects of novelty and utility relate to details of the construction and operation of the embodiment chosen for illustration and as described and claimed hereinafter in view of the annexed drawings, in which:

FIGURE 1 is a fragmentary top plan view of the gang coil assembly with parts shown in section;

FIGURE 2 is a fragmentary elevational view of the polar end of one electromagnet or coil looking along lines 2—2 of FIGURE 1;

FIGURE 3 is a fragmentary plan view of one of the electromagnets, similar to FIGURE 1 but with the coil shown in section and in an altered position;

FIGURE 4 is an exploded perspective of the gang coil stator or frame assembly;

FIGURE 5 is an end elevational view of a gang relay employing the coil assembly;

FIGURE 6 is a perspective fragment of parts of the chassis and one armature;

FIGURE 7 is a fragmentary elevational view of the armature of FIGURE 6 with chassis parts shown in section;

FIGURE 8 is a top plan view of the coil-mounting side of the chassis with the coil assembly removed.

Referring first to FIGURE 5 which depicts the endwise elevation of a gang relay of a type particularly adapted to employ the novel coil assembly, the relay structure is carried on a channel-shaped chassis 10 equipped with mounting brackets 11.

Across the open side or bottom of the chassis there will be installed a series of separate contact assemblies 12 each provided with a latching and trip-out finger 13 and a reset finger 14, the latter projecting through the main wall surface of the chassis for engagement by a long reset bar 15 mounted to slide on the outside face of this chassis wall under urgence of a resetting solenoid 16, the energization of which will move the contact reset finger 14 in a direction against the tension of a special variable-rate spring 17 (as well as the tension of the contact blades, not seen) to a "set" condition in which the contact means will be automatically latched by the finger 13 in an engagement of the edge thereof, as in FIGURE 5, with an offset lug 48 on a corresponding trip-out armature 40 (FIGURE 6).

One of the practical aspects of such a gang relay is that it can be modified for operation of a desired number of contact sets, which may be added or removed at will, the chassis in one of its commercial adaptations being preferably cut to a length to accommodate from two to six contact sets, it being deemed most feasible to add another chassis if more than six contact sets are needed.

The presently disclosed coil assembly is of a character to facilitate the installation and removal of electromagnetic operating coils in desired numbers on such a gang relay, or any analogous device employing a plurality of control electromagnets.

The coil assembly depicted in FIGURE 1 is adapted by preference to employ one to three electromagnets or coils 20. Such coil assemblies are also made up commercially for only two coils in order that desired odd and even multiples may be had on a single chassis, such as two, three, four, five, etc. coils.

The electromagnetic coils themselves consist of the usual solenoid winding 21 on a bobbin 22, preferably molded to provide a rectangular pole bore 23 of a size to fit easily but closely about a corresponding pole leg 25 in the stator or field frame assembly 24 in the manner illustrated in FIGURES 1, 2 and 3.

The stator or frame assembly, as seen in FIGURE 4, comprises a set of laminations 26 or punchings of magnetic iron each consisting of a long flat bar portion 26A from one side of which project a series of salient pole pieces or legs 25, there being elongated holes 27 at the ends of one bar section to receive locking screws for purposes to appear.

The number of punchings or laminations 26 employed will depend on size of coil required and the magnetic circuit required and the thickness of the magnetic iron stock to be used. For most alternating current adaptations four laminations may be used.

A particular one of the laminations 28 will be a coil-locking bar and will differ from the remaining punchings in the stack by the provision of short lateral locking noses or projections 29 at the ends thereof, which constitute the working salient pole faces 30 of the magnet (FIGURES 1 and 2).

The stator or frame assembly is completed by the provision of a special bracket punching 32 also consisting of a long bar portion 33 from which project a set of pole legs 25A aligning with the legs on the other punchings. However, the long bar portion of the bracket punching is of wider stock and has a form stamped into it to provide a long stepped flange 34 adapted to seat upon the chassis and be affixed thereto by screws 35 in the manner seen in FIGURE 5.

Struck up at opposite ends of the bar section to project oppositely from the legs 25A, are mounting lugs 36 pierced and tapped to receive bar-locking screws 37 (FIGURE 1), which traverse the registered elongated holes 27 through all of the assembled laminations.

One side wall of the chassis (FIGURES 5 and 6) is punched to provide a desired number (usually six) of coil openings or windows 38 each of a size to freely admit one of the coils 20 when the coil assembly is seated on the side of the chassis by means of the stepped flange 34, as in FIGURE 5.

Interiorly of the chassis channel, as in FIGURES 5, 6, 7 and 8, are individual armature plates 40, each provided with pivot tabs 41 projecting freely through mounting holes 42 punched in the main wall of the chassis. These tabs may be twisted or bent if desired to capture the armature in the assembly. However, each armature is supplied with its own normal spring 43 anchored at one end to an offset tab 44 on the armature, and at the opposite end to an upset lug 45 on the chassis (FIGURES 5 and 7). This spring urges the armature away from the pole face 30 of the corresponding electromagnet or "coil," and also serves to retain the armature plate in removably-seated condition on the chassis in those cases in which the pivot tabs 41 are not twisted to lock the armature in the assembly.

The operation of the individual relay units is such that when the gang contact sets are "reset" by action of the solenoid 16 and the common reciprocable reset bar 15, the latch and trip-out fingers 13 on each movable contactor will move past and lock behind an offset latching lug 48 on the appertaining armature plate (FIGURES 5, 6, 7) and be held indefinitely in that condition until it is tripped out as a result of the armature being magnetically attracted to the full-line position of FIGURE 5 to disengage the corresponding latching finger 13, thus permitting the spring means 17 and inherent spring action of the contact blades to restore the movable contact assembly to the tripped or "operated" condition.

Should any coil burn out or otherwise require servicing or removal, perhaps along with a corresponding contact set, or should it become necessary to add one or more coils and contact sets, it is merely required that the two stator mounting screws 35 be removed for withdrawal of the gang magnet assembly, the two locking screws 37 being loosened to permit sliding the locking lamination toward the right in FIGURE 1 until the polar locking lugs or projections are shifted from the locking position of FIGURE 1 to the release position of FIGURE 2, it being noted that the lateral width of the pole legs 25B is slightly narrower than that of the other lamination to permit such shifting.

In the foregoing release condition, any coil may be slipped off its pole leg as depicted in FIGURE 3.

Thus, the gang coil assembly with shiftable locking laminations forming part of the stator or frame assembly, make it a simple matter to seat or remove the magnet coils for purposes of assembly, repair, replacement by coils of different resistance, etc. without disturbance of other parts of the relay system.

The efficiency of the magnetic circuit afforded by the integral multi-pole stator and coil assembly is such that no significant cross effects appear in one magnetic leg when the coil of another is energized.

In this connection, the chassis will preferably be of ferromagnetic metal and the magnetic circuit for each coil leg and armature will include to some degree the localized magnetic mass of the chassis so that stray magnetic effects to and from adjoining coil units are insignificant.

It is to be understood that the three-coil or three-pole assembly illustrated in FIGURES 1 and 4 may also be made in a configuration for two or any higher number of poles and that magnetizing coils will normally be omitted from any pole leg not in use in the particular apparatus with which the gang coil assembly may be used. In the illustrative gang relay, whenever any position is idle and the coil has been omitted the corresponding armature 40 will likewise be omitted.

Thus, with reference to FIGURE 5, by way of illustration, one of the contact assemblies 12 may be situated on the chassis 10 at any one or all of the six positions respectively corresponding to a desired one of the six coil windows 38. If all six positions were needed the chassis shown in FIGURE 8 would require use of two three-coil type assemblies shown in FIGURES 1 and 4. Yet one or more of the contact assemblies at some intermediate location (window 38) might be omitted and the magnetizing coil 20 (as well as the corresponding armature 40) at any such omitted position would not serve any purpose and would likewise be omitted.

While the gang coil structure is satisfactorily operative when mounted on a non-magnetic chassis or support, somewhat greater magnetic efficiency results from the use of a magnetic support such as the metal chassis 10 because of the effect of the latter in completing the individual magnetic circuits through each pole leg and the appertaining armature and its pivotal mounting on said chassis.

I claim:

1. A gang coil structure for electromagnetic devices and comprising a magnetic frame assembly including a plurality of parallel pole legs integrally joined in spaced-apart parallelism to a common supporting portion at one end and each having an opposite salient end constituting a working pole face; a magnetizing coil removably fitting upon each said leg; and a unitary coil-locking member shiftably carried by said assembly and including a locking part situated near the pole face of each pole leg and blocking escape of the appertaining coil in one of the shifting positions of said locking member, and disposed in another shifting position in a non-blocking relation to the appertaining coil to permit installation upon, or removal of any coil from its corresponding pole leg; and means for releasably securing said locking member at least in said non-blocking position.

2. A gang coil assembly for relays and the like and comprising a magnetic stator frame of particular configuration including a plurality of spaced-apart pole legs each adapted to receive thereon a magnetizing coil and each integrally joined at one end to a common connecting member and having at its opposite end region a working pole face for cooperation with a corresponding relay or like armature member; and a coil-locking member also having substantially the same particular configuration to fit in registered assembly with the aforesaid stator frame and to slide laterally with respect thereto in the direction of the pole legs, each said leg including the appertaining parts of the locking member being of a dimension to fit within the bore of a corresponding magnetizing coil and each locking-member leg portion having a width lateral to its length slightly less than the diameter of said bore so as to be able to shift laterally therein; and a locking portion adjacent the end of the portion of each locking member adjoining the working pole of the appertaining stator frame parts having a locking formation moved laterally of the bore of the coil to secure the same in assembly therewith when the locking member is shifted laterally as aforesaid to one position, and moved laterally in an opposite direction toward said bore to free the coil in another position.

3. In a multi-coil, multi-pole laminated stator stack having spaced-apart salient pole legs with free polar ends and each adapted to have a magnetizing coil removably fitted thereon over the said polar end thereof, the improvement which comprises a locking lamination having substantially the same configuration as the others in the stack including polar leg portions each alignable with a corresponding leg in the stack, said locking lamination being shiftable in the stack to move each leg portion laterally of the corresponding leg portion in the stack within a magnetizing coil fitted thereon; and coil-retaining means on each leg portion of the locking lamination movable, responsive to opposite shifting of the locking lamination, to and from a coil-blocking position whereby to prevent or permit placement upon or removal of a coil therefrom depending upon which of the shifting positions the locking lamination occupies.

4. A multi-coil, multiple-pole electromagnetic assembly for relays and the like comprising a stator assembly formed of a plurality of magnetic laminations substantially identically-shaped and each consisting of an elongated bar section from a side of which project a plurality of elongate, parallel pole projections respectively alignable in the stack with the like projections of other laminations to define polar legs each adapted to fit into the bore of a corresponding magnetizing coil; at least one magnetizing coil having a bore of predetermined lateral width to fit upon any said polar leg of the stack, at least one of said laminations being movable in relation to the others in the stack so that the pole projection thereof will occupy either of two shifted positions relative to the appertaining polar leg, each pole projection having an offset coil-locking projection disposed in one said shifted position to lie inwardly of the bore of a coil as defined aforesaid so that such coil may be placed upon or removed from such pole leg, and said locking projection being disposed in another said shifted position laterally outwardly of said coil bore to block movement of the latter onto or from the appertaining pole leg.

5. For use in a gang relay having a plurality of armatures spaced apart in a linear series, a multi-pole, multi-coil electromagnetic assembly comprising a stack of stator laminations each comprising an elongated magnetic bar from a side of which pole-forming legs project at right angles in parallel relation and at intervals corresponding to the spacing of said armatures, said laminations being assembled with the legs thereof in registry to define the stator and salient poles each of a given diametric width, a first one of said laminations having offset mounting formations for attaching the stack to a relay structure as aforesaid in cooperative relation to the armatures thereof, a second one of said laminations being shiftable relative to the others in the stack so as to move the several pole-forming legs thereof laterally of the other legs in the appertaining salient pole of which it is a part, magnetizing coil means removably engageable with any salient pole in the assembly and comprising a solenoid type of winding having a bore freely fittable upon any of said salient poles; the shiftable second lamination aforesaid being of a lateral width to shift within the bore of said coil to occupy either of two positions of shift; and coil-blocking means on each pole-forming leg and so located as to block movement of a coil relative to the appertaining salient pole in one of said shift positions, and to permit free movement of a coil onto and from the appertaining salient pole in the other shift position together with means for releasably securing said second lamination on either of said shift positions.

6. A gang electromagnetic device comprising a magnetic core structure having a plurality of salient pole legs arranged in a series in connection with a common magnetic member supporting the same, said legs being of uniform cross-sectional configuration, and each having a free polar end constituting a working pole face together with movable coil-locking parts respectively adjacent said pole faces; shiftable means including as a part of said assembly and connected in common to all said coil-locking parts and shiftable relative to the assembly to move said locking parts in unison to and from a coil-locking position; and a magnetizing coil having a bore with a cross-sectional configuration to freely fit upon any said leg when the coil-blocking part thereof is shifted from coil-locking position, and having a portion blocked by the coil-locking part in locking position on the appertaining pole leg; and securing means adjustable to prevent or permit shifting movement of said shiftable means.

7. An electromagnetic device as defined in claim 6 in which said core structure including said legs is defined by an assembly of laminations, and said locking parts and shiftable means constitute formations which are integral parts of one of said laminations.

8. A device according to claim 7 in which said securing means comprises at least one threaded member threadedly engaging one of said laminations through an elongated passage in other laminations and threadedly settable to clamp the shiftable means against movement relative to the other laminations.

9. In an electromagnet an elongated pole piece having an end portion constituting a working pole face; said pole piece being formed of at least two mating laminations; means for releasably securing said laminations in assembly in a condition of predetermined alignment or non-alignment and permitting in a releasing condition movement of one said lamination relative to the other in a direction lateral to the lengths of both laminations; a magnetizing coil having a bore of a diameter permitting entry and passage of said pole piece into and through the bore when said laminations are in said predetermined condition of alignment; and means carried by one lamination in close proximity to the working pole face thereof in a position to be disposed laterally of the bore of said coil thereon in the non-aligned condition of the laminations for obstructing movement of the coil at least lengthwise along the pole piece in a direction toward said pole face.

10. An electromagnetic device having a plurality of individually and selectively energizable electromagnets each with a corresponding working pole forming an integral part of a common magnetic stator frame; and means including a shiftable magnetic pole member forming part of said frame and having a like plurality of working pole formations each respectively alignable with one of said electromagnetic poles and movable relative to and from a coil-locking position in which the several coils aforesaid are each secured or freed from movement onto and off their respective working poles.

11. A multi-coil electromagnet comprising a magnetic frame in the form of an elongated base bar having a plurality of pole pieces extending laterally therefrom at spaced points along its length and each of a dimension to fit into the bore of a corresponding magnetizing winding; said frame including a movable portion and a relatively stationary portion, both said portions being of substantially identical mating configuration to include a base bar portion with corresponding pole legs as aforesaid, said portions fitting together in registry to define the frame; means securing one said base bar portion to the other and permitting relative shifting of one base bar portion lengthwise of the other so as to shift each pole piece of the one portion relative to its corresponding pole piece on the other base bar portion; and a magnetizing winding for each pole leg having a bore adapted to fit upon a corresponding pole piece when the respective base bar portions are in registry, each pole piece having a member disposed out of alignment with the bore of an appertaining winding at a point serving to prevent removal of such winding when said base bar portions are relatively out of alignment as aforesaid.

12. A gang electromagnet assembly with removable coils comprising in combination with magnetizing coils having a bore of given lateral width, an elongated stator bar having linear salient poles projecting laterally from a side thereof and formed of an assembly of aligned laminations which are substantially identical in configuration and size with the exception of one, which one has the lateral width of its salient poles slightly narrower than the poles of the other laminations, means joining said laminations in a registered stack constituting the stator assembly with said one lamination shiftable relative to the others in the direction of the long axis of the stator bar whereby the salient poles thereof shift laterally of the width of the other poles, into and out of a predetermined condition of alignment in which one of said coils may be fitted upon or removed from any pole in said condition of alignment, each of the poles on said one shiftable lamination having a lateral coil-locking projection extending beyond the lateral width thereof and the width of the bore of said coils such that when said one lamination is shifted out of aligned condition, locking projections on each pole will lie in a blocking relation to a coil thereon and prevent removal thereof.

References Cited

UNITED STATES PATENTS

| | | | |
|---|---|---|---|
| 1,585,630 | 5/1926 | Carpenter et al. | 336—197 X |
| 2,266,618 | 12/1941 | Stimson | 336—197 X |

BERNARD A. GILHEANY, *Primary Examiner.*

G. H. HARRIS, *Assistant Examiner.*